US011876306B2

(12) United States Patent
Harper

(10) Patent No.: US 11,876,306 B2
(45) Date of Patent: Jan. 16, 2024

(54) CHASSIS ANTENNA

(71) Applicant: Microsoft Technology Licensing, LLC, Redmond, WA (US)

(72) Inventor: Marc Harper, Snohomish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 95 days.

(21) Appl. No.: 17/354,615

(22) Filed: Jun. 22, 2021

(65) Prior Publication Data

US 2022/0407229 A1 Dec. 22, 2022

(51) Int. Cl.

*H01Q 1/24* (2006.01)
*H01Q 5/378* (2015.01)
*H01Q 7/00* (2006.01)

(52) U.S. Cl.

CPC ............. *H01Q 7/005* (2013.01); *H01Q 1/241* (2013.01)

(58) Field of Classification Search

CPC .......... H01Q 1/24; H01Q 1/241; H01Q 1/243; H01Q 7/00; H01Q 7/005; H01Q 1/22; H01Q 1/2266; H01Q 5/328; H01Q 5/378; H01Q 5/40; H01Q 9/40; H01Q 9/42

See application file for complete search history.

(56) References Cited

U.S. PATENT DOCUMENTS 8,508,418 B2 8/2013 Kough et al.
8,816,921 B2 8/2014 Ayatollahi
9,711,858 B1 * 7/2017 Lee .......................... H01Q 9/06
10,705,570 B2 7/2020 Kuna et al.
2013/0328723 A1 12/2013 Rappaport
2014/0118204 A1 5/2014 Gavilan et al.
2014/0347227 A1 * 11/2014 Iellici ....................... H01Q 5/40 343/702
2014/0375515 A1 * 12/2014 Qiu ........................ H01Q 5/378 343/745

(Continued)

FOREIGN PATENT DOCUMENTS

CN 208782035 U 4/2019
EP 2993730 A1 3/2016

(Continued)

OTHER PUBLICATIONS

Aqeel, et al., "A Dual-Band Multiple Input Multiple Output Frequency Agile Antenna for GPSL 1/Wi-Fi/WLAN2400/LTE Applications", In International Journal of Antennas and Propagation, vol. 2016, Nov. 22, 2016, pp. 1-12.

(Continued)

*Primary Examiner* — Thai Pham
(74) *Attorney, Agent, or Firm* — Alleman Hall Creasman & Tuttle LLP

(57) ABSTRACT

Examples are disclosed that relate to an antenna formed in a chassis of a device. One example provides a wireless device comprising a chassis and a chassis antenna formed at least in part by a dielectric gap between a body of the chassis and the chassis antenna, where a first end of the chassis antenna is defined by a cut-out in the chassis and where a second end of the chassis antenna being conductively connected to a body of the chassis. The wireless device further comprises a modem, and a coupled feed connected to the modem and capacitively coupled to the chassis antenna.

17 Claims, 7 Drawing Sheets

(56) References Cited

U.S. PATENT DOCUMENTS

| | | | | |
|---|---|---|---|---|
| 2015/0280323 | A1* | 10/2015 | Liu | H01Q 5/357 343/745 |
| 2016/0164192 | A1* | 6/2016 | Lin | H01Q 5/314 343/749 |
| 2016/0294061 | A1* | 10/2016 | Harper | H01Q 5/378 |
| 2016/0301139 | A1* | 10/2016 | Lombardi | H01Q 1/42 |
| 2020/0204199 | A1 | 6/2020 | Wu et al. | |

FOREIGN PATENT DOCUMENTS

| | | | |
|---|---|---|---|
| WO | 2018219113 | A1 | 12/2018 |
| WO | 2020044033 | A1 | 3/2020 |

OTHER PUBLICATIONS

"International Search Report and Written Opinion Issued in PCT Patent Application No. PCT/US22/029092", dated Sep. 8, 2022, 11 Pages.

* cited by examiner

CHASSIS ANTENNA

BACKGROUND

Antennas for wireless devices can take many forms. Some wireless devices include antennas defined in a device chassis by externally exposed cut-outs.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to an antenna formed in a chassis of a device. One example provides a wireless device comprising a chassis and a chassis antenna formed at least in part by a dielectric gap between a body of the chassis and the chassis antenna, where a first end of the chassis antenna is defined by a cut-out in the chassis and where a second end of the chassis antenna is conductively connected to a body of the chassis. The wireless device further comprises a modem, and a coupled feed connected to the modem and capacitively coupled to the chassis antenna.

DETAILED DESCRIPTION

As previously mentioned, a wireless device can comprise a chassis antenna formed by cut-outs in a device chassis. Many current chassis antennas are formed from cutouts at each end of the antenna. As a wireless device may wirelessly communicate over multiple frequency bands, such as bands for Wi-Fi, Bluetooth, and/or cellular networks, multiple antennas may be used to cover multiple communication frequency bands. Thus, a wireless device may comprise multiple chassis antennas, each defined by multiple cutouts. However, the use of multiple cut-outs in the metal chassis may be undesirable from an industrial design perspective, as the cut-outs may distract from a visual appeal of the design. Further, the multiple cut-outs in the chassis may diminish the structural strength of the chassis.

Accordingly, examples are disclosed that relate to a wireless device comprising a chassis antenna that may provide multiple frequency bands via the use of fewer cut-outs than conventional chassis antennas. Briefly, the chassis antenna is formed at least in part by a dielectric gap between a body of the chassis and the chassis antenna. A first end of the chassis antenna is defined by a cut-out in the chassis and a second end of the chassis antenna is conductively connected to a body of the chassis. Further, the wireless device comprises a coupled feed connected to a modem and capacitively coupled to the chassis antenna. In some examples, the wireless device may further comprise an antenna tuner connected to the chassis and to the chassis antenna, and/or a coupled ground connected to the chassis and capacitively connected to the coupled feed. Such configurations may provide for multiple communication frequency bands with fewer cut-outs in the chassis than conventional chassis antennas.

Figure 1:
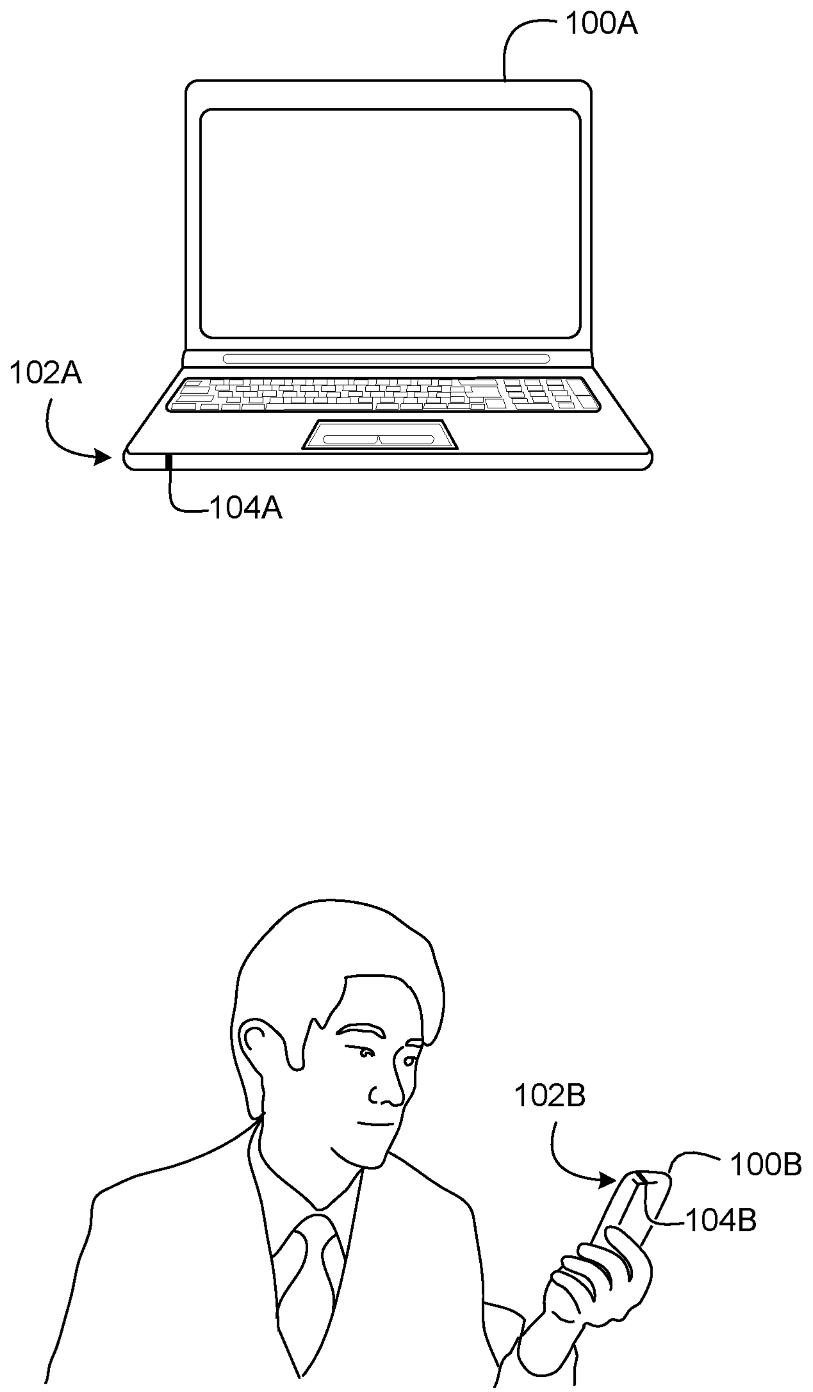
FIG. 1 shows example wireless devices.

FIG. 1 shows example wireless devices that utilize chassis antennas. Wireless device 100A takes the form of a laptop computer, and comprises a chassis antenna 102A located at a corner of the device. A first end of the chassis antenna 102A is defined by a cut-out 104A in a chassis of the device, while a second end is conductively connected to a body of the chassis, as discussed in more detail below. Wireless device 100B takes the form of a smartphone, and comprises a chassis antenna 102B, where a first end of the chassis antenna is defined by a cut-out 104B in a chassis, and the second end is conductively connected to a body of the chassis. It will be understood that wireless device 100A and wireless device 100B are illustrative and not intended to be limiting, as a wireless device according to the present disclosure may take any other suitable form in other examples, such as a tablet device, head-mounted display device, or wrist worn device.

Figure 2:
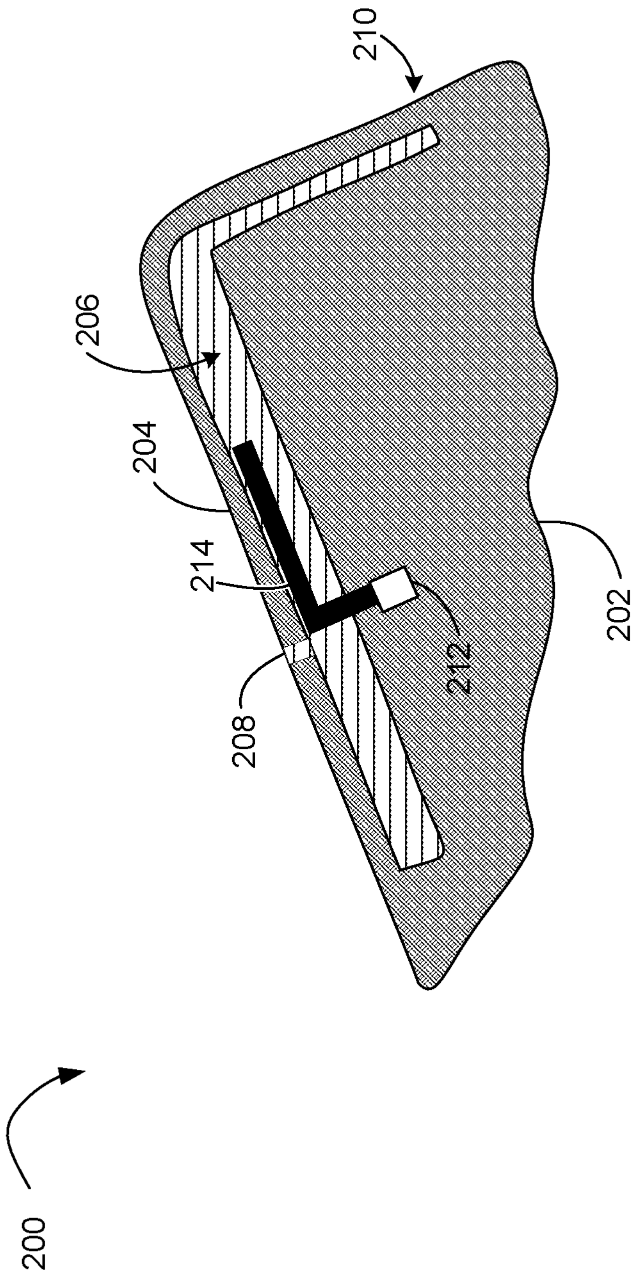
FIG. 2 shows a corner detail of an example wireless device comprising a chassis antenna.

FIG. 2 shows a corner detail of an example wireless device 200 comprising a chassis antenna 204. Wireless device 200 is an example of wireless devices 100A and 100B. Chassis antenna 204 is formed at least in part by a dielectric gap 206 located between a body of a chassis 202 and chassis antenna 204. A first end of chassis antenna 204 is defined by a cut-out 208 of the chassis, while a second end of chassis antenna 204 is conductively connected to the chassis, as shown at 210, thereby avoiding a gap at the second end of chassis antenna 204. Dielectric gap 206 may comprise a dielectric polymer or any other suitable dielectric material. The use of a dielectric polymer or other dielectric material than air helps to strengthen the chassis relative to the use of an air gap, and also provides for more resistance to moisture, dust, and other possible contaminants. Likewise, cut-out 208 also comprises a dielectric material, which may be the same dielectric material as that located within gap 206, or any other suitable dielectric material. Defining chassis antenna 204 by a cut-out at the first end of chassis antenna 204, while conductively coupling chassis antenna 204 to the body of chassis 202 at the second end of chassis antenna 204, reduces a number of gaps used to define the antenna compared to antennas with gaps at both ends. This may provide for a structurally stronger chassis than a chassis comprising a chassis antenna defined by cut-outs at both ends.

Chassis antenna 204 may be configured to have any suitable fundamental frequency. In some examples, the fundamental frequency may be in the range of 600 MHz to 960 MHz, which may correspond to some cellular frequency bands. In other examples, any other suitable fundamental frequency range may be covered by chassis antenna 204.

Wireless device 200 further comprises a coupled feed 214 conductively connected to a modem 212 and capacitively coupled to chassis antenna 204. Modem 212 is configured to drive a signal onto coupled feed 214. The capacitive coupling between coupled feed 214 and chassis antenna 204 excites chassis antenna 204 at the fundamental frequency of the chassis antenna. In some examples, coupled feed 214 may be configured to radiate a wireless signal in the range of 1.7 GHz to 2.7 GHz, which may support a Wi-Fi 2.4 GHz band and/or a Bluetooth 2.4 GHz band. In other examples, coupled feed 214 may be configured to radiate a wireless signal at any other suitable frequency.

Further, coupled feed 214 also may be configured to excite chassis antenna 204 at one or more harmonic frequencies of chassis antenna 204. Thus, the configuration of FIG. 2 may provide for multiple frequency ranges via a single chassis antenna capacitively coupled to coupled feed 214, further helping to reduce a number of cut-outs in the chassis compared to separate chassis antennas for different frequency bands.

In the depicted example, coupled feed 214 is located adjacent to the first end of chassis antenna 204. In other examples, coupled feed 214 may be located at any other suitable location along chassis antenna 204. Locating coupled feed 214 adjacent to the first end of chassis antenna 204 may provide for a stronger antenna signal than locating coupled feed 214 closer to the second end of chassis antenna 204. In the depicted example, coupled feed 214 comprises an L-shape, but may have other suitable shapes in other examples, such as a T-shape or an F-shape.

Figure 3:
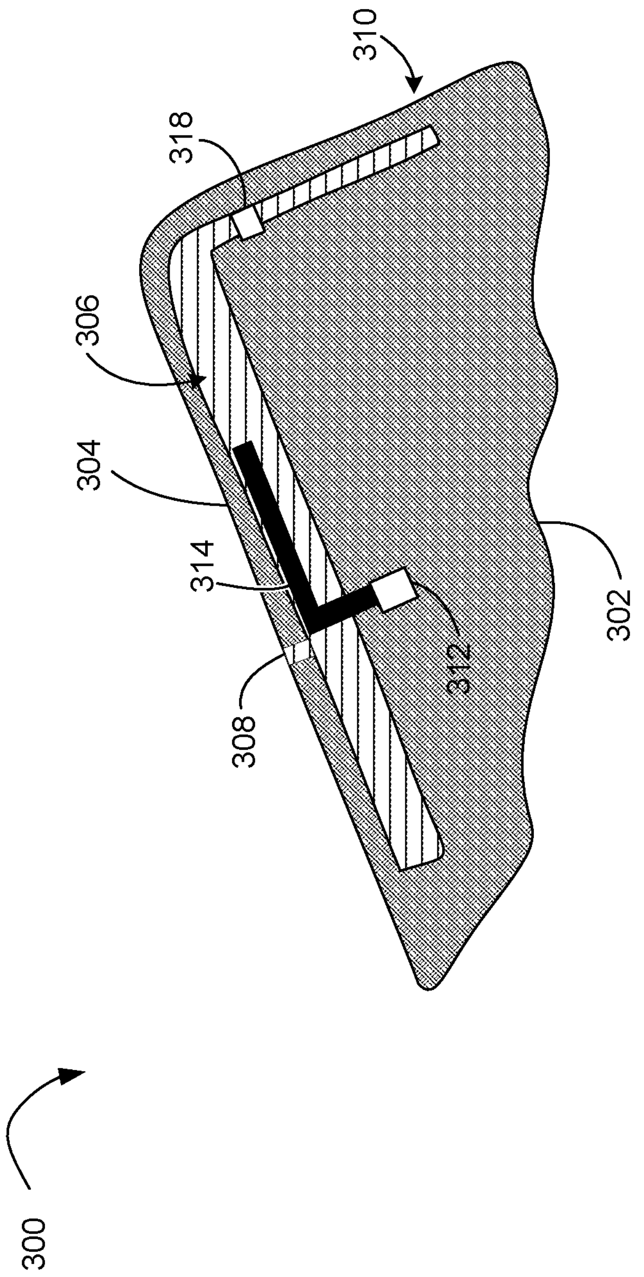
FIG. 3 shows a corner detail of another example wireless device comprising a chassis antenna.

FIG. 3 shows a corner detail of another example wireless device 300. Wireless device 300 is another example of wireless devices 100A and 100B. Similar to wireless device 200, wireless device 300 comprises a chassis antenna 304, a dielectric gap 306 between a body of a chassis 302 and chassis antenna 304, a modem 312, and a coupled feed 314. Wireless device 300 further comprises an antenna tuner, schematically illustrated at 318, that is configured to tune chassis antenna 304 to a selected frequency. For example, wireless signals communicated via cellular networks can be within different frequency bands, wherein each frequency band may comprise multiple frequency channels. In such an example, a wireless device may connect to a cellular network at a first frequency channel when in one geographic location, and a second frequency channel in a different geographic location. Thus, antenna tuner 318 can be controlled to tune chassis antenna 304 to an appropriate frequency for a network connection. In the example of FIG. 3, antenna tuner 318 is located approximately midway along chassis antenna 304. In other examples, antenna tuner 318 may be located at a proximity to a first end of the chassis antenna, at a proximity to a second end of the chassis antenna, at a proximity of coupled feed 314, or at any suitable location along chassis antenna 304. Further, in some examples, wireless device 300 may comprise one or more additional tuners each located at any suitable location along the chassis antenna.

Figure 4:
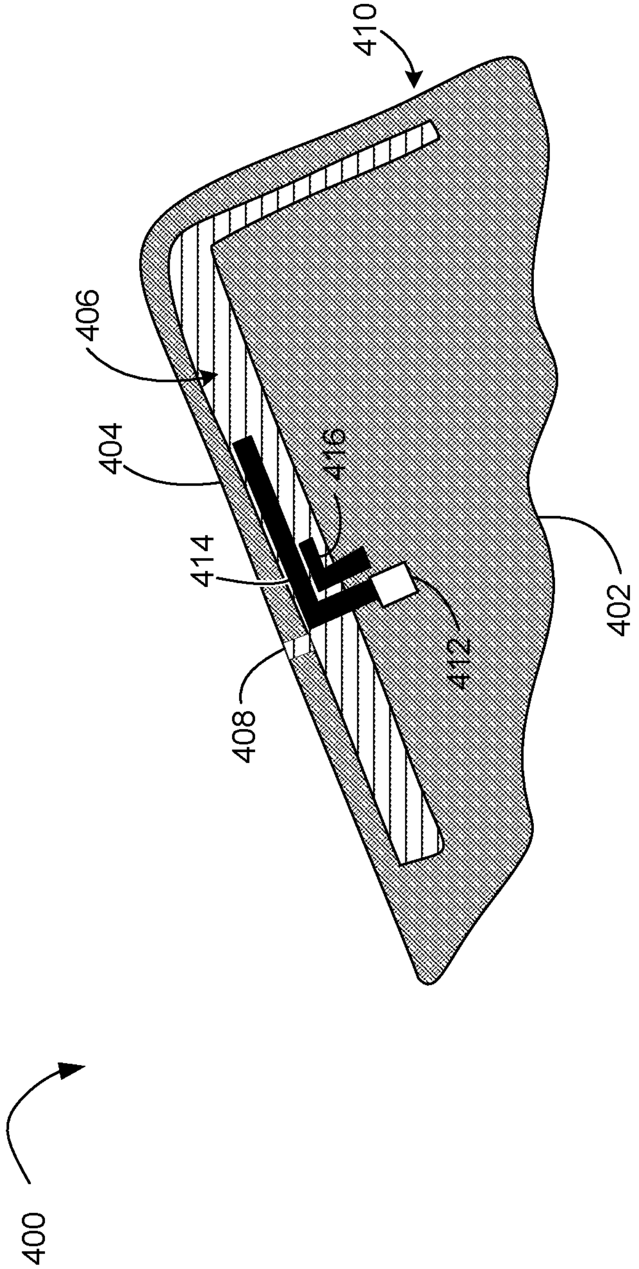
FIG. 4 shows a corner detail of another example wireless device comprising a chassis antenna.

FIG. 4 shows a corner detail of another example wireless device 400. Wireless device 400 is another example of wireless devices 100A and 100B. Similar to wireless device 200, wireless device 400 comprises a chassis 402, a chassis antenna 404, a dielectric gap 406 located between a body of the chassis 402 and chassis antenna 404, a modem 412, and a coupled feed 414. Wireless device 400 also comprises a coupled ground 416 conductively connected to chassis 402 and capacitively coupled to coupled feed 414, wherein coupled ground 416 and coupled feed 414 form a loop antenna. In some examples, the loop antenna may provide a frequency band in the range of 2.7 GHz to 5 GHz. In other examples, a coupled ground and associated coupled feed may support any other suitable frequency range. Thus, wireless device 400 provides frequency bands associated with chassis antenna 404 (e.g. 600 MHz to 960 MHz), frequency bands associated with coupled feed 414 (e.g. 1.7 GHz to 2.7 GHz), and frequency bands associated with the loop antenna provided by the coupling of coupled feed 414 and coupled ground 416 (e.g. 2.7 GHz to 5 GHz), using a single cut-out in the chassis of the device. In the depicted example, coupled ground 416 and coupled feed 414 each comprises an L-shape. In other examples, coupled ground 416 and/or coupled feed 414 each may comprise a T-shape, an F-shape, and/or any other suitable shape.

Figure 5:
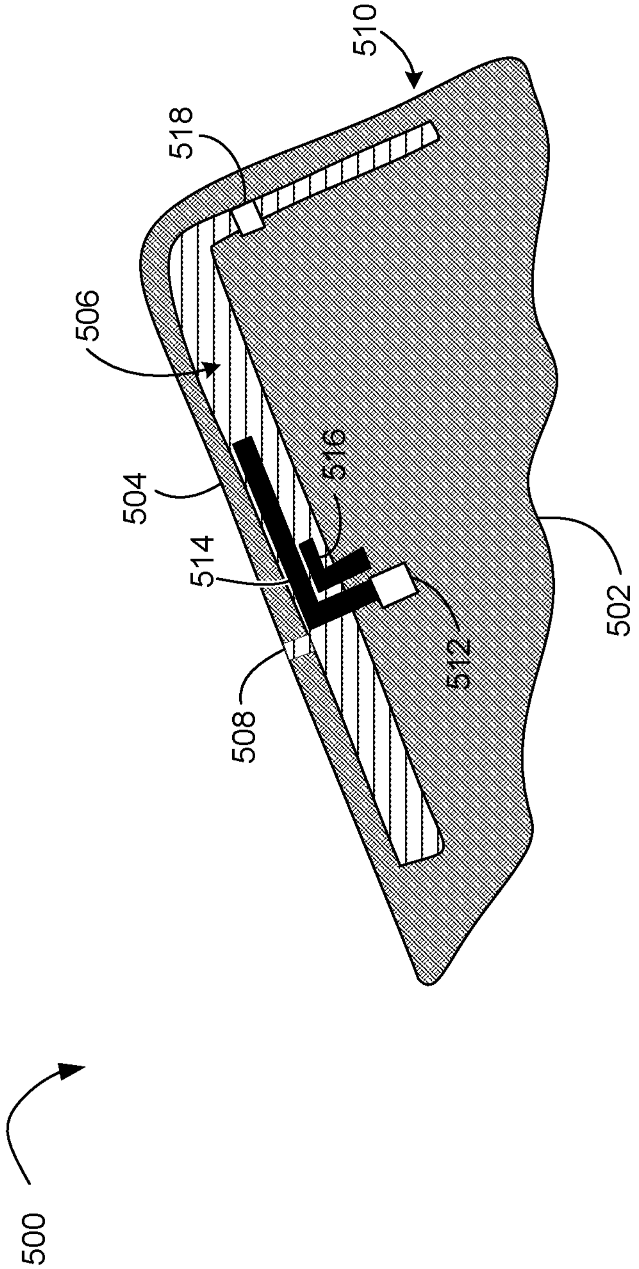
FIG. 5 shows a corner detail of another example wireless device comprising a chassis antenna.

FIG. 5 shows a corner detail of another example wireless device 500. Wireless device 500 is another example of wireless devices 100A and 100B. Similar to wireless device 200, wireless device 500 comprises a chassis 502, a chassis antenna 504, a dielectric gap 506 between a body of chassis 502 and chassis antenna 504, a modem 512, and a coupled feed 514, wherein coupled feed 514 excites chassis antenna 504 at a fundamental frequency of the chassis antenna, as well as at one or more harmonic frequencies.

Similar to wireless device 300, wireless device 500 further comprises an antenna tuner 518 configured to tune chassis antenna 504 to a selected frequency, for example, by adjusting the fundamental frequency of the chassis antenna. In some examples, the fundamental frequency of the chassis antenna may be in a range of 600 MHz to 960 MHz, and coupled feed 514 may be configured to radiate in a frequency range of 1.7 GHz to 2.7 GHz. In other examples, the chassis antenna and the coupled feed may be configured to radiate at any other suitable frequency range.

Wireless device 500 also comprises a coupled ground 516. Coupled ground 516 and coupled feed 514 may be configured to form a loop antenna, as previously mentioned, which may provide another frequency band for wireless device 500. In some examples, the loop antenna may be configured to radiate at a frequency in the range of 2.7 GHz to 5 GHz, or at any other suitable frequency in other examples. Thus, in some examples, chassis antenna 504, coupled feed 514, and coupled ground 516 provide for operation at frequency bands within a range of 600 MHz to 5 GHz, with fewer cut-outs in a chassis of a device than conventional chassis antennas that define chassis antennas by cut-outs at each end of the antenna.

Figure 6:
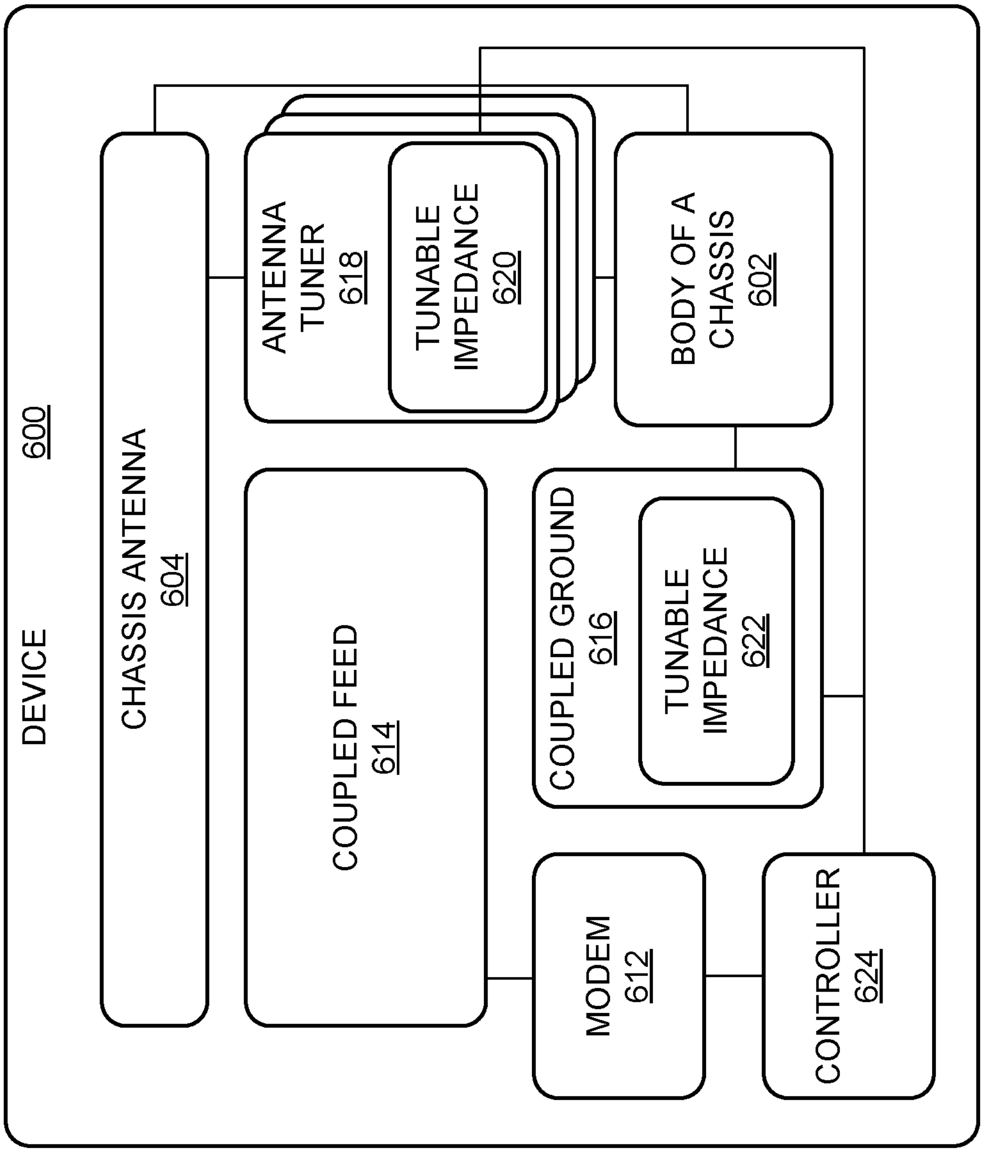
FIG. 6 shows a block diagram of an example wireless device comprising a chassis antenna.

FIG. 6 shows a block diagram of an example wireless device 600. Wireless device 100, wireless device 200, wireless device 300, wireless device 400, and wireless device 500 are examples of wireless device 600. Wireless device 600 comprises a chassis antenna 604 connected to a body of a chassis 602, and a coupled feed 614 connected to a modem 612 and capacitively connected to chassis antenna 604, as previously discussed. In some examples, wireless device 600 may further comprise a coupled ground 616 conductively connected to the body of chassis 602 and capacitively connected to coupled feed 614. In some examples, coupled ground 616 may comprise a tunable impedance 622 configurable to adjust an antenna impedance of one or more of the coupled feed 614 and the chassis antenna 604. In other examples, coupled ground 616 may not be tunable. Further, in some examples, wireless device 600 may comprise one or more antenna tuners 618, each connected to chassis antenna 604 and chassis 602. As previously discussed, each antenna tuner 618 is configured to tune chassis antenna 604 to a selected frequency, and thus comprises a variable impedance 620. Example elements that may be used to provide tunable impedance include variable capacitors and/or, tunable surface mount technology (SMT) capacitors and/or inductors, and digitally tuned microelectromechanical system (MEMS) devices. Each antenna tuner may be configured to tune a different frequency band to thereby support a wide variety of communications frequencies via a smaller number of chassis cut-outs than conventional antennas. In other examples, such tuners may be omitted.

Wireless device 600 further comprises a controller 624. Controller 624 may be configured to set a frequency of modem 612. The frequency of modem 612 may impact a radiation frequency of coupled feed 614 and further may impact one or more frequencies excited on chassis antenna 604. Controller 624 may further be configured to adjust tunable impedance 622, as previously discussed. Further, controller 624 may be configured to tune variable impedance 620 of each antenna tuner 618 such that a change in the variable impedance adjusts a frequency of the chassis antenna. In a cellular network example, for example, controller 624 may be configured to adjust the frequency of chassis antenna 604 to a frequency requested by a cellular network.

Thus, a wireless device comprising a chassis antenna formed at least in part by a dielectric gap between a chassis and the chassis antenna, where a first end of the chassis antenna is defined by a cut-out of the chassis and a second end of the chassis antenna is conductively connected to the chassis, and a coupled feed capacitively coupled to the chassis antenna as described herein, may provide a range of frequency bands with fewer cut-outs in the chassis than conventional chassis antennas. Further, a wireless device may comprise one or more of an antenna tuner and a coupled ground as described herein to extend the range of frequencies provided of the wireless device.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
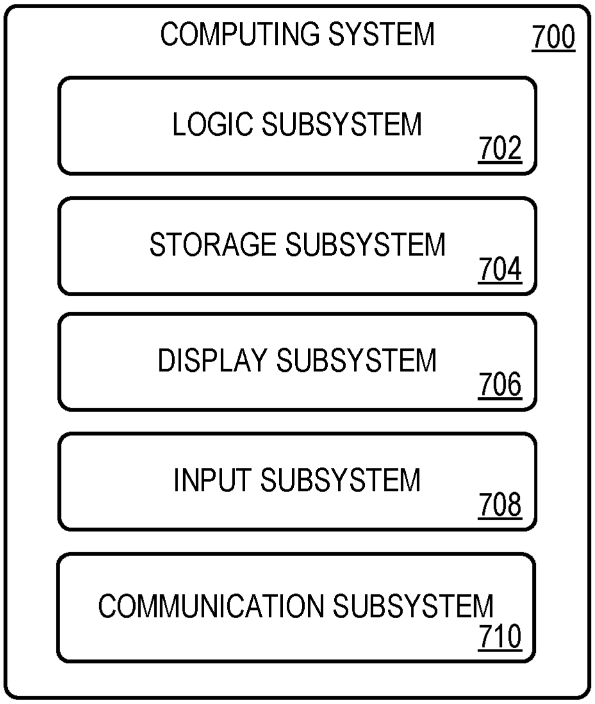
FIG. 7 shows a block diagram of an example computing system.

FIG. 7 schematically shows a non-limiting embodiment of a computing system 700 that can enact one or more of the methods and processes described above. Computing system 700 is shown in simplified form. Computing system 700 may take the form of one or more personal computers, server computers, tablet computers, home-entertainment computers, network computing devices, gaming devices, mobile computing devices, mobile communication devices (e.g., smart phone), and/or other computing devices. Wireless devices 100A, 100B, 200, 300, 400, 500, and 600 are examples of computing system 700.

Computing system 700 includes a logic subsystem 702 and a storage subsystem 704. Computing system 700 may optionally include a display subsystem 706, input subsystem 708, communication subsystem 710, and/or other components not shown in FIG. 7.

Logic subsystem 702 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage subsystem 704 includes one or more physical devices configured to hold instructions executable by the logic machine to implement the methods and processes described herein. When such methods and processes are implemented, the state of storage subsystem 704 may be transformed—e.g., to hold different data.

Storage subsystem 704 may include removable and/or built-in devices. Storage subsystem 704 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 704 may include volatile, nonvolatile, dynamic, static, read/write, read-only, random-access, sequential-access, location-addressable, file-addressable, and/or content-addressable devices.

It will be appreciated that storage subsystem 704 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 702 and storage subsystem 704 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 706 may be used to present a visual representation of data held by storage subsystem 704. This visual representation may take the form of a graphical user interface (GUI). As the herein described methods and processes change the data held by the storage machine, and thus transform the state of the storage machine, the state of display subsystem 706 may likewise be transformed to visually represent changes in the underlying data. Display subsystem 706 may include one or more display devices utilizing virtually any type of technology. Such display devices may be combined with logic subsystem 702 and/or storage subsystem 704 in a shared enclosure, or such display devices may be peripheral display devices.

When included, input subsystem 708 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 710 may be configured to communicatively couple computing system 700 with one or more other computing devices. Communication subsystem 710 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 700 to send and/or receive messages to and/or from other devices via a network such as the Internet.

Another example provides a wireless device comprising a chassis, a chassis antenna formed at least in part by a dielectric gap between a body of the chassis and the chassis antenna, a first end of the chassis antenna defined by a cut-out in the chassis and a second end of the chassis antenna being conductively connected to a body of the chassis, a modem, and a coupled feed connected to the modem and capacitively coupled to the chassis antenna. In some examples, the device alternatively or additionally comprises a coupled ground conductively connected to the body of the chassis, and capacitively coupled to the coupled feed. In some examples, the coupled ground is alternatively or additionally configured to comprise a tunable impedance. In some examples, the device alternatively or additionally comprises an antenna tuner connected to the body of the chassis and connected to the chassis antenna. In some examples, the antenna tuner is alternatively or additionally configured to have a tunable impedance. In some examples, the dielectric gap alternatively or additionally comprises a polymer. In some examples, the coupled feed is alternatively or additionally located adjacent to the first end of the chassis antenna. In some examples, the device alternatively or additionally comprises a laptop computer.

Another example provides a wireless device comprising a chassis, a chassis antenna formed at least in part by a dielectric gap between a body of the chassis and the chassis antenna, a first end of the chassis antenna defined by a cut-out in the chassis and a second end of the chassis antenna being conductively connected to a body of the chassis, a modem, a coupled feed connected to the modem and capacitively coupled to the chassis antenna, and a coupled ground conductively connected to the body of the chassis and capacitively coupled to the coupled feed. In some examples, the coupled ground is alternatively or additionally configured to have a tunable impedance. In some examples, the coupled feed is alternatively or additionally located adjacent to the first end of the chassis antenna. In some examples, the coupled feed and the coupled ground are alternatively or additionally configured to form a loop antenna. In some examples, the coupled feed is alternatively or additionally configured to excite the chassis antenna at a fundamental frequency of the chassis antenna. In some examples, the coupled feed is alternatively or additionally configured to excite the chassis antenna at one or more harmonic frequencies of a fundamental frequency of the chassis antenna.

Another examples provides a wireless device comprising a chassis, a chassis antenna formed at least in part by a dielectric gap between a body of the chassis and the chassis antenna, a first end of the chassis antenna defined by a cut-out in the chassis and a second end of the chassis antenna being conductively connected to a body of the chassis, a modem, a coupled feed connected to the modem and capacitively coupled to the chassis antenna, and an antenna tuner connected to the body of the chassis and connected to the chassis antenna. In some examples, one or more of the chassis antenna and the coupled feed are alternatively or additionally configured to operate at a frequency band within a range from 600 MHz to 5 Ghz. In some examples, the dielectric gap alternatively or additionally comprises a polymer. In some examples, the coupled feed is alternatively or additionally configured to excite the chassis antenna at a fundamental frequency of the chassis antenna. In some examples, the coupled feed is alternatively or additionally configured to excite the chassis antenna at one or more harmonic frequencies of a fundamental frequency of the chassis antenna. In some examples, the wireless device alternatively or additionally comprises a laptop computer.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A wireless device comprising:

a chassis;

a chassis antenna formed at least in part by a dielectric gap between a body of the chassis and the chassis antenna, a first end of the chassis antenna defined by a cut-out in the chassis and a second end of the chassis antenna being conductively connected to the body of the chassis;

a modem;

a coupled feed connected to the modem, located adjacent to the first end of the chassis antenna, and capacitively coupled to the chassis antenna; and a coupled ground conductively connected to the body of the chassis, and capacitively coupled to the coupled feed to form a loop antenna such that the loop antenna provides one or more additional frequency bands for communication.

2. The device of claim 1, wherein the coupled ground is configured to comprise a tunable impedance.

3. The device of claim 1, further comprising an antenna tuner connected to the body of the chassis and connected to the chassis antenna.

4. The device of claim 3, wherein the antenna tuner is configured to have a tunable impedance.

5. The device of claim 1, wherein the dielectric gap comprises a polymer.

6. The device of claim 1, wherein the device comprises a laptop computer.

7. A wireless device comprising:

a chassis;

a chassis antenna formed at least in part by a dielectric gap between a body of the chassis and the chassis antenna, a first end of the chassis antenna defined by a cut-out in the chassis and a second end of the chassis antenna being conductively connected to the body of the chassis;

a modem;

a coupled feed connected to the modem and capacitively coupled to the chassis antenna; and a coupled ground conductively connected to the body of the chassis and capacitively coupled to the coupled feed to form a loop antenna such that the loop antenna provides one or more additional frequency bands for communication.

8. The device of claim 7, wherein the coupled ground is configured to have a tunable impedance.

9. The device of claim 7, wherein the coupled feed is located adjacent to the first end of the chassis antenna.

10. The device of claim 7, wherein the coupled feed is configured to excite the chassis antenna at a fundamental frequency of the chassis antenna.

11. The device of claim 7, wherein the coupled feed is configured to excite the chassis antenna at one or more harmonic frequencies of a fundamental frequency of the chassis antenna.

12. A wireless device comprising:

a chassis;

a chassis antenna formed at least in part by a dielectric gap between a body of the chassis and the chassis antenna, a first end of the chassis antenna defined by a cut-out in the chassis and a second end of the chassis antenna being conductively connected to the body of the chassis;

a modem;

a coupled feed connected to the modem and capacitively coupled to the chassis antenna;

a coupled ground conductively connected to the body of the chassis and capacitively coupled to the coupled feed to form a loop antenna such that the loop antenna provides one or more additional frequency bands for communication; and an antenna tuner connected to the body of the chassis and connected to the chassis antenna.

13. The device of claim 12, wherein one or more of the chassis antenna and the coupled feed are configured to operate at a frequency band within a range from 600 MHz to 5 Ghz.

14. The device of claim 12, wherein the dielectric gap comprises a polymer.

15. The device of claim 12, wherein the coupled feed is configured to excite the chassis antenna at a fundamental frequency of the chassis antenna.

16. The device of claim 12, wherein the coupled feed is configured to excite the chassis antenna at one or more harmonic frequencies of a fundamental frequency of the chassis antenna.

17. The device of claim 12, wherein the wireless device comprises a laptop computer.

* * * * *